United States Patent [19]
Beuther et al.

[11] 3,908,047
[45] Sept. 23, 1975

[54] PROCESS FOR COATING AN ALUMINA BASE

[75] Inventors: Harold Beuther; Thaddeus P. Kobylinski, both of Gibsonia; Roger F. Vogel, Butler, all of Pa.

[73] Assignee: Gulf Research & Development Company, Pittsburgh, Pa.

[22] Filed: Dec. 5, 1973

[21] Appl. No.: 421,829

[52] U.S. Cl. .............. 427/282; 427/226; 427/256; 427/287; 427/435; 427/443
[51] Int. Cl.² .......................................... B05D 1/32
[58] Field of Search ........ 117/5.5, 38, 46 R, 46 CC, 117/113, 135, 168, 37 R, DIG. 9

[56] References Cited
UNITED STATES PATENTS
2,897,097 7/1959 Smith et al...................... 117/135 X
3,647,730 3/1972 Rott et al......................... 117/5.5 X Primary Examiner—Thomas J. Herbert, Jr.
Assistant Examiner—Bruce H. Hess

[57] ABSTRACT

A process for coating an alumina having a high surface area disposed as a coating on a monolith having a low surface area which involves impregnating a first portion of the alumina coating with a paraffin wax, impregnating a second portion of the alumina coating with an aqueous or alcoholic solution of a first noble metal salt, subsequently calcining the treated monolith to remove the paraffin wax on the first portion of the alumina coating and to deposit a first noble metal on the second portion of the alumina coating, impregnating the second portion of the alumina coating carrying the first noble metal with a paraffin wax, impregnating the first portion of the alumina coating with an aqueous or alcoholic solution of a second metal salt and subsequently calcining the impregnated monolith to remove the paraffin wax on the second portion of the alumina coating and to deposit the second noble metal on the first portion of the alumina coating.

8 Claims, No Drawings

PROCESS FOR COATING AN ALUMINA BASE

This application relates to a process for depositing distinct coatings of noble metals on a high surface alumina coating carried on the surface of a low surface area monolith support.

In many reactions, particularly gas phase reactions, it is desirable to employ a monolithic high surface area alumina carrying a noble metal (platinum, palladium, ruthenium, osmium and iridium) thereon. In some cases, as, for example, in our copending application Ser. No. 421,830, filed concurrently herewith, entitled PROCESS FOR PURIFYING AUTO EXHAUST GASES, it is desirable to apply distinct and separate coatings of different noble metals to distinct and separate portions of said monolith so that the gaseous reactants can pass sequentially thereover.

For example, if the high surface area alumina monolith is partially immersed in an aqueous or alcoholic solution of a first noble metal salt, not only is the immersed portion of the alumina monolith impregnated with the noble metal salt solution, but, by capillary action, the remainder of the alumina monolith is also impregnated with the noble metal solution. When the remaining end of the alumina monolith is later immersed in an aqueous or alcoholic solution of a second noble metal salt, similarly the entire monolith is impregnated with the second noble metal salt solution. Whether the impregnated monolith is calcined after each impregnation or only after the second, the resulting monolith will have the two noble metals indiscriminately distributed over the entire body of the monolith.

Plugging the pores of one portion of the monolith with common organic compounds, such as hexane, octane, hexanol, octanol, etc., so that a free portion of the monolith can be impregnated with an aqueous or alcoholic solution of a noble metal salt will not suffice, because capillary action will result in the impregnation of the entire monolith with the organic compound and will effectively prevent any subsequent coating or impregnation of the monolith with an aqueous or alcoholic solution of a noble metal. Plugging the pores of one portion of the monolith with a paraffin wax, so that a free portion thereof can be impregnated with an aqueous or alcoholic solution of a noble metal salt will also not suffice. The paraffin wax will penetrate only a short distance into the interior of the monolith that is immersed in paraffin wax, for example, a depth of about 0.25 to about 2.50 mm. Therefore, when an uncoated portion of the alumina monolith is then impregnated with an aqueous or alcoholic solution of the noble metal salt, the remainder of the monolith not coated with the paraffin wax, which includes not only said uncoated portion but substantially all of the interior of the monolith coated with the paraffin wax, will also be impregnated with the noble metal solution because of capillary action.

We have found that the above difficulties can be overcome and separate and distinct, laterally-disposed, noble metal coatings can be placed on a high surface area alumina by using as a base or support therefor a low surface area, highly impervious, substantially inert monolith carrying a coating thereon composed of said high surface area alumina and employing paraffin wax to control impregnation of the alumina coating with the aqueous or alcoholic solutions of noble metal salts. The monolith can be composed, for example, of any low surface area, highly impervious, inert material, such as glass, metals (for example, iron), fused alumina, fused silica, cordierite, spodumene, mullite, beryl, zirconia, zircon, porcelain, fused magnesia, titania, etc. The size and form of the monolith base can be varied over a wide range, provided it is sufficiently large so that the alumina coating thereon can carry over separate portions thereof reasonably extensive distinct and separate coatings of noble metals. Thus, the base can be in the form of a honeycomb, a bar, a rod, a tube, a roll, a coil, etc. In a preferred embodiment the base is a ceramic honeycomb structure composed of thin walls whose thicknesses range from about 0.1 to about 0.5 millimeter, preferably from about 0.2 to about 2.0 millimeters. Examples of such ceramic honeycomb structures are well-known in the art and are described, for example, in U.S. Pat. Nos. 3,112,184, 3,255,027, 3,338,995, 3,444,925 and 3,473,987. Any high surface area, finely-divided active alumina can provide the surface coating on the defined base. Thus, the surface area of the alumina can be in the range of about 1.0 to about 500m$^2$ per gram, preferably from about 10 to about 200m$^2$ per gram, with a layer thickness of about 1.0 to about 1,600 microns, preferably about 2.0 to about 900 microns, and a pore diameter in the range of about 10 to about 300 A, preferably about 50 to about 300 A.

The preparation of the above structure constitutes no part of the present invention and can be prepared in any convenient manner. For example, one method involves dipping the high-surface area monolith in a solution containing aluminum hydroxide powder and water as described, for example, in U.S. Pat. No. 3,554,929. Another method for preparing the base structure to be coated herein is described in U.S. Pat. No. 3,767,453. The monolith is removed from the solution, excess coating is drained off, dried at a temperature of about 80° to about 140° C. for about 1 to about 16 hours and then calcined at a temperature of about 250° to about 800° C. for about 1 to about 20 hours.

The organic material that will be used herein to seal the pores and inhibit undesired capillary action of the alumina coating prior to impregnation of an unsealed portion thereof with a solution of noble metals is a paraffin wax (mostly saturated aliphatic straight chain hydrocarbons having from 18 to 70 carbon atoms, preferably from 22 to 50 carbon atoms) having a melting point at atmospheric temperature and pressure of about 35° to about 100° C., preferably about 45° to about 85° C.

The solution used in the impregnations herein is preferably an aqueous or alcoholic solution containing from about 0.01 to about 20 weight per cent of a noble metal salt, preferably from about 0.05 to about 10 weight per cent of a noble metal salt, such as the chloride or nitrate of platinum, palladium, rhodium, ruthenium, osmium and iridium. If desired, mixtures of noble metal salts, such as platinum and palladium, platinum and rhodium or palladium and rhodium salts, can be used. In preparing the alcoholic solution any alkanol having from one to five carbon atoms, can be used, such as methanol, ethanol, propanol, n-butanol and n-pentanol.

The process of the invention is simply effected. A first portion of a monolith carrying an alumina coating thereon, as described above, is immersed in a molten bath (for example, having a temperature of about 40° to about 150° C., preferably about 50° to about 90° C.) for a time (for example, about one to about 60 minutes, preferably about 5 to about 40 minutes) suffcent to impregnate the entire portion of the alumina coating immersed in the paraffin wax bath from the outer to the inner surface thereof. The paraffin wax will not flow into that portion of the alumina coating not immersed in the paraffin wax bath. The impregnated monolith is then cooled (for example, to a temperature of about 10° to about 50° C., preferably about 20° to about 40° C., for about 5 to about 60 minutes, preferably for about 10 to about 40 minutes) to solidify the paraffin wax. An uncoated second portion of the monolith is then impregnated, for example, by immersion, in an aqueous or alcoholic solution of a noble metal salt, for example, $RuCl_3$, maintained, for example, at a temperature of about 10° to about 45° C., preferably about 15° to about 30° C., for about one to about 60, preferably about 5 to about 40 minutes. At this point a first portion of the alumina coating will be completely impregnated with the paraffin wax and a second portion will be completely impregnated with the noble metal salt.

The impregnated monolith can be dried, for example, at a temperature of about 80° to about 140° C., preferably about 90° to about 130° C., for about 1 to about 20 hours, preferably for about 2 to about 16 hours and then is calcined in air at a temperature of about 400° to about 800° C., preferably about 460° to about 650° C., for about 1 to about 20 hours, preferably for about 2 to about 16 hours. As a result of calcination, the paraffin wax will be decomposed and volatilized, leaving behind a first portion of the alumina coating substantially free of paraffin wax, and a second portion carrying a noble metal coating, for example, $RuO_2$, thereon.

The second portion of the alumina coating carrying the noble metal coating, as defined above, is then impregnated with paraffin wax as defined above. As before, no paraffin wax moves into the remainder of the alumina coating. A free portion of the base carrying the alumina coating is then impregnated, as described above, with a second aqueous or alcoholic solution containing a second noble metal salt, for example, chloroplatinic acid. At this point the treated base will have an alumina coating thereon, one portion of which is impregnated with a second noble metal salt and another portion of which carries a first noble metal and is impregnated with a paraffin wax. The treated base can be dried then calcined, as defined above, and with the same results. The resultant base will carry an alumina coating thereon, one portion of which carries a first noble metal distended thereon and a second portion which carries a second noble metal distended thereon.

If desired, the impregnated coatings carrying a solution of a noble metal salt thereon can be contacted with $NH_3$ or $H_2S$ for a period of about 0.3 to about 5 hours at a temperature of about 10° to about 100° C., prior to drying to stabilize the metal salt in the alumina coating and to prevent the same from migrating during the drying and calcination steps.

The discovery herein can be illustrated by the following.

EXAMPLE I

A cylinder, one inch long and ½-inch in diameter, composed of gamma alumina having a surface area of 180m² per gram, was immersed half way into normal hexane at a temperature of 26°C. for 40 minutes. Hexane penetrated throughout the portion of the cylinder immersed in hexane and, by capillary action, moved upwardly and saturated that portion thereof that was not immersed in normal hexane. Excess normal hexane was removed from the cylinder, which was then immersed in a 10 weight per cent aqueous solution of $RuCl_3$ for 20 minutes at 26° C. No impregnation of the cylinder with the noble metal solution resulted.

EXAMPLE II

A cylinder such as that used in Example I was immersed half way into a paraffin wax, having a melting point of 55° C., at its melting point for five minutes. The cylinder was removed from the molten wax, cooled to solidify the paraffin wax thereon and then split longitudinally. It was observed that the paraffin wax penetrated into the immersed portion of the cylinder to a depth of about 1/16-inch, but that the paraffin wax did not penetrate into that portion of the cylinder that was not immersed into the wax. A similar cylinder was similarly immersed in the same molten paraffin wax and then cooled to solidify the paraffin wax thereon. The portion not covered with paraffin wax was immersed a 10 weight per cent aqueous solution of $RuCl_3$ for 15 minutes at 26° C. The cylinder was then split longitudinally and it was found that the ruthenium solution had penetrated throughout the immersed portion of the cylinder and additionally, by capillary action, had saturated the upper portion thereof. The only portion not impregnated with the ruthenium solution was the 1.5 millimeters thick outside shell that had been coated with paraffin wax.

EXAMPLE III

A cylinder composed of alumina as in Examples I and II was immersed half way into a 10 weight per cent aqueous solution of $RuCl_3$ for 15 minutes at 26° C. It was apparent that immediately upon immersion due to capillary action the upper portion of the cylinder not immersed in the ruthenium solution was being saturated with the ruthenium solution. The cylinder was dried at 120° C. for 16 hours and calcined at 538° C. for 16 hours, after which that portion of the cylinder not immersed in the ruthenium solution was immersed in a 0.4 weight per cent aqueous solution of chloroplatinic acid for 30 minutes at 26° C. The cylinder was dried at 120° C. for 16 hours and calcined at 500° C. for 16 hours. It was found that ruthenium and platinum were indiscriminately distended throughout the body of the cylinder.

EXAMPLE IV

A cylinder similar to that of Examples I, II and III composed of gamma alumina having a surface area of 180m₂ per gram, and an average pore diameter of 50 A was immersed half way into normal hexane at a temperature of 26° for five minutes. As a result of capillary action the entire cylinder was saturated with normal hexane. Several attempts to impregnate the cylinder with aqueous solutions of $RuCl_3$ failed to deposit any solution thereon.

The following show that by carrying out the procedure defined herein the difficulties can be overcome.

EXAMPLE V

Two ceramic cylinders, each six inches long and having a diameter of 2.66 inches, substantially imprevious and having no appreciable surface area, carrying a coating thereon composed of gamma alumina having a surface area of 200m² per gram, and an average pore diameter of 50 A, with the coating having a thickness of 400 microns, were immersed one-third of their length into paraffin wax, heated slightly above its melting point of 60° C. for 30 minutes, removed from the molten wax and placed in a refrigerator to cool. The cooled cylinders were then placed into a 1,400 cc. of solution containing 4.8 milligrams of Ru as $RuCl_3$ per one milliliter of solution, 11.5 milligrams of $AlCl_3 \cdot 6H_2O$ per one milliliter of solution, 54.2 milligrams of 86 per cent $H_3PO_4$ per one milliliter of solution, and the remainder water, maintained at 26° C., for 30 minutes, drained thoroughly and then gaseous $NH_3$ was passed thereover at the rate of 200 cubic centimeters per minute at a temperature of 30° C. for 1 hour. The treated cylinders were oven-dried at 120° C. for 16 hours, during which time the paraffin wax melted and was recovered, and then calcined for 6 hours at 260° C. and then for 16 hours at 649° C. The portions of the cylinders carrying the metal coating were impregnated with paraffin wax and cooled using the procedure used above. The cylinders were then immersed in an aqueous solution containing 10 milligrams of platinum as chloroplatinic acid in one milliliter of solution at a temperature of 26° C. for 30 minutes and gaseous $H_2S$ was passed thereover at a rate of 200 cubic centimeters per minute at a temperature of 30° C. for 1 hour. The cylinders were dried at 120° C. for 2 hours and then calcined at 500° C. for 16 hours. One of the cylinders was split longitudinally and revealed excellent separation of metals from each other, with one-third of the entire coating carrying platinum thereon and the remainder carrying ruthenium. The cylinder was found to be carrying 0.35 weight per cent platinum and 0.10 weight per cent ruthenium.

The second cylinder was tested for its ability to remove nitrogen oxides from auto exhaust gases under reducing conditions and its ability to remove carbon monoxide and unburned hydrocarbons under oxidizing conditions. Thus, the exhaust gas from a 350 cubic inch Chevrolet engine containing 1.8 volume per cent CO, 0.6 volume per cent $H_2$, 14.1 volume per cent $CO_2$, 1,200 ppm of unburned hydrocarbons, 0.2 volume per cent $O_2$ and 1,000 ppm of nitrogen oxides was passed successively into contact with the platinum and ruthenium coatings on said cylinder, which was maintained at a temperature of 510° C., at a gas hourly space velocity of 60,000 volumes of gas per hour per volume of cylinder. Under these reducing conditions the nitrogen oxides in the treated gas were reduced to 20 parts per million and only about 4.0 volume per cent of the nitrogen oxides were converted to ammonia. The run was repeated under oxidizing conditions by adding about four volume per cent of oxygen, based on the exhaust gas, to the exhaust gas. The treated gas contained only 0.1 volume per cent CO and 12 ppm of unburned hydrocarbons.

EXAMPLE VI

The run of Example V was repeated except that the ruthenium solution used did not contain $AlCl_3$ and $H_3PO_4$. The results obtained were similar to those of Example V.

Obviously, many modifications and variations of the invention, as hereinabove set forth, can be made without departing from the spirit and scope thereof, and, therefore, only such limitations should be imposed as are indicated in the appended claims.

We claim:

1. A process for coating an alumina having a surface area of about 1.0 to about 500 square meters per gram, a layer thickness of about 1.0 to about 1600 microns and a pore diameter of about 10 to about 300 A disposed as a coating on a highly impervious and substantially inert monolith having a low surface area which comprises impregnating a first portion of said alumina coating with a paraffin wax by immersing said monolith in a molten paraffin wax bath having a temperature of about 40° to about 150°C for about 1 to about 60 minutes, cooling the impregnated monolith to solidify the paraffin wax, impregnating a second portion of said alumina coating by immersion in an aqueous or alkanoic solution of a first noble metal salt maintained at a temperature of about 10° to about 45°C for about 1 to about 60 minutes, wherein the alkanol has from one to five carbon atoms, subsequently calcining the treated monolith in air at a temperature of about 400° to about 800°C for about 1 to about 20 hours to remove the paraffin wax on said first portion of the alumina coating and to deposit theron a first noble metal on said second portion of said alumina coating, impregnating said second portion of said alumina coating with a paraffin wax by immersing said monolith in a molten paraffin wax bath having a temperature of about 40° to about 150°C for about one to about 60 minutes, cooling the impregnated monolith to solidify the paraffin wax impregnating said first portion of said alumina coating by immersion in an aqueous or alkanoic solution of a second metal salt maintained at a temperature of about 10° to about 45°C for about 1 to about 60 minutes, wherein the alkanol has from one to five carbon atoms and subsequently calcining the impregnated monolith in air at a temperature of about 400° to about 800°C for about one to about 20 hours to remove the paraffin wax on said second portion of said alumina coating and to deposit a second noble metal on said first portion of said alumina coating.

2. The process of claim 1 wherein said first metal is ruthenium and said second metal is platinum.

3. The process of claim 1 wherein said first metal is ruthenium and said second metal is palladium.

4. The process of claim 1 wherein said first metal is ruthenium and said second solution contains a mixture of a platinum and a palladium salt.

5. The process of claim 1 wherein said noble metal solutions are aqueous.

6. The process of claim 1 wherein said noble metal solutions are alcoholic.

7. The process of claim 1 wherein said alumina coating has a thickness of about two to about 900 microns.

8. The process of claim 1 wherein said alumina has a surface area of about 10 to about 200m² per gram.

* * * * *